United States Patent
Bedwell (10) Patent No.: US 7,969,823 B2
(45) Date of Patent: Jun. 28, 2011

(54) METHODS, SYSTEMS AND APPARATUS FOR MEASURING ACOUSTIC PRESSURE

(75) Inventor: Ian Bedwell, Rydalmere (AU)

(73) Assignees: Thales Underwater Systems Pty Limited, Rydalmere, New South Wales (AU); The Commonwealth of Australia, Canberra, ACT (AU)

( * ) Notice: Subject to any disclaimer, the term of this patent is extended or adjusted under 35 U.S.C. 154(b) by 291 days.

(21) Appl. No.: 12/085,126

(22) PCT Filed: Nov. 21, 2006

(86) PCT No.: PCT/AU2006/001742
§ 371 (c)(1),
(2), (4) Date: May 16, 2008

(87) PCT Pub. No.: WO2007/056827
PCT Pub. Date: May 24, 2007

(65) Prior Publication Data
US 2009/0135673 A1    May 28, 2009

(30) Foreign Application Priority Data

Nov. 21, 2005  (AU) ............................... 2005906457

(51) Int. Cl.
*G01H 9/00*    (2006.01)
*H04R 1/44*    (2006.01)
(52) U.S. Cl. ......................... 367/149; 73/655; 356/477
(58) Field of Classification Search .................. 367/149; 356/477, 478; 73/655
See application file for complete search history.

(56) References Cited

U.S. PATENT DOCUMENTS

| 4,995,014 A * | 2/1991 | Hoornstra ..................... 367/153 |
| 5,986,749 A | 11/1999 | Wu et al. |
| 6,137,621 A | 10/2000 | Wu |
| 6,188,645 B1 | 2/2001 | Maida et al. |
| 6,252,656 B1 | 6/2001 | Wu et al. |
| 6,314,056 B1 | 11/2001 | Bunn et al. |
| 6,349,103 B1 * | 2/2002 | Chung et al. .................... 372/32 |

FOREIGN PATENT DOCUMENTS

| EP | 0 977 022 A2 | 2/2000 |
| GB | 2 117 993 A | 10/1983 |
| WO | WO 01/35062 | 5/2001 |
| WO | WO 2006/034538 A1 | 4/2006 |

OTHER PUBLICATIONS

Hill, J.D., et al; "A fiber laser hydrophone array", in Proc. SPIE Conf. Fiber Optic Sensor Technology and Applications, Sep. 1999, pp. 55-66; vol. 3860, Boston, MA.

* cited by examiner

*Primary Examiner* — Ian J Lobo
(74) *Attorney, Agent, or Firm* — Marshall & Melhorn, LLC (57) ABSTRACT

A hydrophone (10) for immersion in a liquid body defining a pressure is disclosed The hydrophone (10) includes a sensor (11) for providing an electrical signal indicative of the pressure; and a transducer (12) electrically connected to the sensor (11). The transducer (12) acts upon a fiber optic cable (15) so as to convert the electrical signal into a corresponding optical output signal for transmission within the fiber optic cable (15). The liquid body defines a depth-dependent static pressure and a dynamic pressure and the sensor (11) provides an electrical signal having a first component indicative of the static pressure and a second component indicative of the dynamic pressure. A filter (16) is electrically connected to the sensor (11) so as to receive (the electrical signal, filter out the first component, and output to the transducer (12) a uttered electrical signal indicative of substantially only the second component.

16 Claims, 7 Drawing Sheets

METHODS, SYSTEMS AND APPARATUS FOR MEASURING ACOUSTIC PRESSURE

FIELD OF THE INVENTION

The present invention relates to methods, systems and apparatus for measuring acoustic pressure, and more particularly to an improved acoustic pressure sensors ad hydrophones. In one embodiment the invention provides a method of filtering out the substantial effects caused on acoustic sensors by the hydrostatic pressure in bodies of liquid, whilst allowing the detection of the faint acoustic signals of interest. The invention has particularly been developed to provide hydrophones that are deployable into the ocean as part of a fibre laser sensing arrangement, and will be described hereinafter with reference to this application. However it will be appreciated that the invention is not limited to this particular field of use.

BACKGROUND OF THE INVENTION

Known hydrophone arrangements used in remote sensing applications, such as in sea bed arrays and underwater arrays, for example, typically make use of piezoelectric devices that require local active in instrumentation. This renders these prior art arrangements more susceptible to detection by unauthorised parties. They also have data and power cabling and pre-amp requirements that make such prior art hydrophone arrays bulky, difficult to deploy and maintain.

In an attempt to address these issues, hydrophones based on fibre optic technology have been developed. For example, it is known to wind a relatively large amount of optic fibre around a bobbin, and subsequently measure effects caused by the stress on this fibre to make pressure determinations. However, known methodologies and apparatus for implementing fibre optic technology in hydrophones result in bulky and complex equipment, such equipment often requiring multiple optical fibres and fibre couplings. Additionally, the complexity of such devices makes it difficult to manage a large number of devices in combination.

Another issue that hinders the applicability of known optical sensing equipment to hydrophone applications is commonly referred to as depth pressure compensation. For example, an acoustic signal that is to be detected by a sensor is typically a small pressure wave that will be referred to herein as "dynamic pressure". By way of non-limiting example, a typical dynamic pressure wave has an amplitude of up to around 100 Pa and is in a frequency range of between approximately 10 Hz and 20 kHz. When submerged, the sensor is additionally subject to a hydrostatic pressure that will be referred to herein as "static pressure". In the ocean this static pressure typically increases by approximately 100,000 Pa for every 10 m of depth. Hence, at depth, the static pressure is typically many orders of magnitude larger than the dynamic pressure. Unfortunately, it is typically the dynamic pressure that is of interest. The difference in magnitude between static and dynamic pressures can cause a hydrophone or similar sensor system to saturate and become deaf to the significantly smaller dynamic pressure-consequently the desired signal is insufficiently detected or in some cases not detected at all. La some cases, the static pressure affects optical equipment in a manner that necessitates the usage of a relatively large optical bandwidth to transmit the resultant signal along an optical fibre cable. These and other complications are compounded as a number of sensors are used in combination.

It is an object of the present invention to overcome or ameliorate at least one of the disadvantages of the prior art, or to provide a useful alternative.

SUMMARY OF THE INVENTION

According to a first aspect of the invention there is provided a hydrophone for immersion in a liquid body defining a depth-dependent static pressure and a dynamic pressure, the hydrophone including:

a sensor for providing an electrical signal having a first component indicative of the static pressure and a second component indicative of the dynamic pressure;

a filter electrically connected to the sensor so as to receive the electrical signal, filter out the first component, and output a filtered electrical signal indicative of substantially only the second component; and a transducer electrically connected to the filter, the transducer acting upon a fibre optic cable so as to convert the filtered electrical signal into a corresponding optical output signal within the fibre optic cable.

In one embodiment the filter defines a cut-off frequency such that frequency components of the electrical signal below the cut-off frequency are filtered out. In one embodiment the filter includes a resistor connected electrically parallel to the sensor, the resistor acting in conjunction with a capacitance of the sensor so as to form a tuned RC circuit.

In one embodiment the transducer is a passive transducer and an impedance of the transducer is substantially matched to an impedance of the sensor. It is also preferable for a mechanical compliance of the transducer to be substantially matched to a mechanical compliance of the fibre optic cable.

In one embodiment the sensor is a piezoelectric sensing ceramic, with a predominantly capacitive impedance.

In one embodiment the transducer is housed within a stiff housing so as to isolate the transducer from pressure exerted by the liquid body.

In one embodiment the fibre optic cable includes a laser active region defining an emitted wavelength varying in accordance with a mechanical strain acting on the laser active region. Also in one embodiment the transducer includes a piezoelectric actuator mechanically connected to a portion of the fibre optic cable having the laser active region. In this embodiment the piezoelectric actuator is electrically connected to the sensor so as to strain the laser active region in response to the electrical signal. For embodiments in which the above-mentioned filter is utilised, the piezoelectric actuator strains the laser active region in response to the filtered electrical signal.

One embodiment includes a plurality of sensors electrically connected to the transducer. In one such embodiment at least some of the sensors are connected electrically parallel to each other. In another such embodiment at least some of the sensors are connected electrically in series with each other.

According to a second aspect of the invention there is provided a hydrophone for immersion in a liquid body defining a depth-dependent static pressure and a dynamic pressure, the hydrophone including:

an outer housing including a piezoelectric sensor for providing an electrical signal having a first component indicative of the static pressure and a second component indicative of the dynamic pressure;

a fitter electrically connected to the piezoelectric sensor so as to receive the electrical signal, filter out the first component, and output a filtered electrical signal indicative of substantially only the second component; and a transducer disposed within the housing, the transducer including at least one piezoelectric actuator electrically connected to the filter such that the piezoelectric actuator is movable in response to the filtered electrical signal, the piezoelectric actuator being mechanically connected to a fibre optic cable having a laser active region so as to convert the filtered electrical signal into a corresponding optical output signal within the fibre optic cable.

In one embodiment the piezoelectric actuator takes the form of a bimorph. One embodiment has a first bimorph piezoelectric actuator and a second bimorph piezoelectric actuator spaced apart from the first bimorph piezoelectric actuator. The fibre optic cable, including the laser active region, extends intermediate the first and second bimorph piezoelectric actuators.

In another embodiment the piezoelectric actuator takes the form of a piezoelectric stack. One embodiment has two piezoelectric stacks spaced apart from one another. The potion of the fibre optic cable, including the laser active region, extends intermediate of and is held by the first and second piezoelectric actuators such that extension or contraction of these stacks results affects strain on the laser active region.

According to a third aspect of the invention there is provided a hydrophone for immersion in a liquid body defining a pressure, the hydrophone including:

a sensor for providing an electrical signal indicative of the pressure;

a transducer electrically connected to the sensor, the transducer acting upon a fibre optic cable so as to convert the electrical signal into a corresponding optical output signal for transmission within the fibre optic cable;

wherein the liquid body defines a depth-dependent static pressure and a dynamic pressure, the sensor providing an electrical signal having a first component indicative of the static pressure and a second component indicative of the dynamic pressure; and wherein a filter is electrically connected to the sensor so as to receive the electrical signal, filter out the first component, and output to the transducer a filtered electrical signal indicative of substantially only the second component.

According to another aspect of the invention there is provided a hydrophone array for immersion in a liquid body defining a pressure, the hydrophone array including:

a plurality of electrically interconnected pressure sensors forming a compound Sensor for providing an electrical signal indicative of the pressure; and a transducer electrically connected to the compound sensor, the transducer acting upon a fibre optic cable so as to convert the electrical signal into a corresponding optical output signal within the fibre optic cable.

In one embodiment more than 100 pressure sensors are electrically interconnected to form the compound sensor, the output of which is transduced into the single fibre optic cable. In some embodiments the compound sensor is a pressure sensing beam.

According to another aspect of the invention there is provided a hydrophone for immersion in a liquid body defining a depth-dependent static pressure and a dynamic pressure, the hydrophone including:

a sensor for providing an electrical signal having a first component indicative of the static pressure and a second component indicative of the dynamic pressure;

a filter electrically connected to the sensor so as to receive the electrical signal, filter out the first component, and output a filtered electrical signal indicative of substantially only the second component, and a transducer electrically connected to the filter, the transducer being responsive to the second component for acting upon a distributed feedback laser in a fibre optic cable so as to convert the filtered electrical signal into a corresponding stain on the distributed feedback laser such that the distributed feedback laser provides an optical output signal corresponding to the strain and hence indicative of the dynamic pressure.

According to another aspect of the invention there is provided a hydrophone for immersion in a liquid body defining a depth-dependent static pressure and a dynamic pressure, the hydrophone including:

an outer housing including a piezoelectric sensor for providing an electrical signal having a first component indicative of the static pressure and a second component indicative of the dynamic pressure;

a filter electrically connected to the piezoelectric sensor so as to receive the electrical signal, filter out the first component, and output a filtered electrical signal indicative of substantially only the second component; and a transducer disposed within the housing, the transducer including at least one piezoelectric actuator electrically connected to the filter such that the piezoelectric actuator is movable in response to the filtered electrical signal, the piezoelectric actuator being mechanically connected to a distributed feedback laser in a fibre optic cable so as to convert the filtered electrical signal into a: corresponding strain on the distributed feedback laser such that the distributed feedback laser provides an optical output signal corresponding to the strain and hence indicative of the dynamic pressure.

According to another aspect of the invention there is provided a hydrophone array for immersion in a liquid body defining a pressure, the hydrophone array including:

a plurality of electrically interconnected pressure sensors forming a compound sensor for providing an electrical signal indicative of the pressure; and a transducer electrically connected to the compound sensor, the transducer acting upon a distributed feedback laser such that the distributed feedback laser provides an optical output signal corresponding to the strain and hence indicative of the dynamic pressure.

According to another aspect of the invention there is provided a hydrophone system including:

a length of optic fibre including a plurality of spaced apart distributed feedback lasers;

a plurality of hydrophone units for immersion in a liquid body defining a pressure, the units being spaced apart on optic fibre for respectively containing the distributed feedback lasers and thereby isolating the lasers from the pressure, each with including a sensor for measuring the pressure and transducer coupled to the sensor for acting upon a distributed feedback laser such that the distributed feedback laser provides an optical output signal indicative of at least a component of the pressure.

BRIEF DESCRIPTION OF THE DRAWINGS

Embodiments of the invention will now be described, by way of example only, with reference to the accompanying drawings, in which.

DETAILED DESCRIPTION

Described herein are methods and apparatus for measuring pressure properties of a body of water, particularly dynamic pressure properties that are affected by the presence of acoustic signals. In some embodiments an optical hydrophone unit is provided, this unit including a pressure sensor coupled to a transducer. The pressure sensor is responsive to pressure properties in the body of water for providing a signal indicative of pressure, typically in the form of an electric signal. This signal is provided to the transducer, in some embodiments subject to a filtering process that substantially filters out a component of the signal that is indicative of static pressure thereby to better reveal a component of the signal that is indicative of the dynamic pressure. The transducer is responsive to the electric signal for proportionally acting on a distributed feedback laser in a fibre optic cable. In some embodiments this includes straining the distributed feedback laser thereby to affect wavelength properties of an optical signal generated by that distributed feedback laser. In some embodiments a plurality of similar hydrophone units are spaced along a single common optic fibre cable having a respective plurality of spaced distributed feedback lasers. The distributed feedback lasers are individually tuned such that the strain on each portion is individually observable by analysis properties of the generated optical signal. This allows the dynamic pressure as measured by each hydrophone unit to be collated and further analyzed at a central location.

Figure 1:
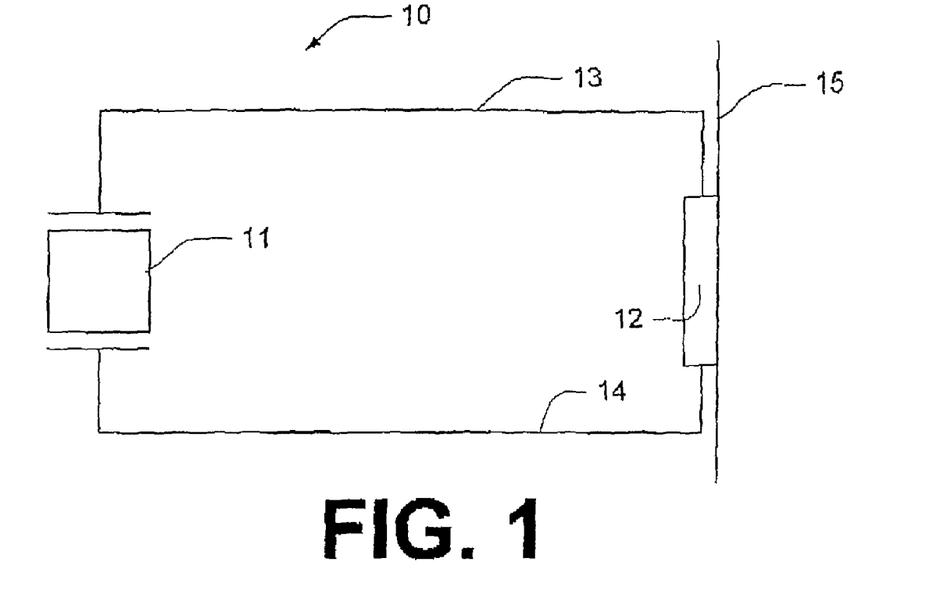
FIG. 1 is a circuit diagram of a first embodiment of the invention.

Referring initially to FIG. 1, an optical hydrophone unit 10 is adapted for immersion in a Liquid body, which is typically the ocean. The hydrophone unit 10 includes a sensor 11 that is exposed to the aquatic pressure field to provide an electrical signal indicative of the pressure of the ocean at the point at which the sensor is deployed. More particularly, the sensor 11 provides a voltage signal that is proportional to the aquatic pressure field.

In some embodiments the sensor 11 is defined by a conventional non-optical hydrophone or known hydrophone components inherently adapted to provide such a voltage signal.

The hydrophone unit 10 also includes a transducer 12 electrically connected to the sensor 11 by conductors 13 and 14. The transducer 12 acts upon a region of fibre optic cable 15 so as to allow conversion of the electrical signal from the sensor 11 into a corresponding optical output signal which is transmitted along the fibre optic cable 15.

In some embodiments the transducer acts upon a laser active portion of the fibre optic cable. For example, the transducer acts upon a distributed feedback laser. The transducer is responsive to electric signals from the sensor 11 for applying strain to the distributed feedback laser, the degree of strain being proportional to the electric signal from sensor 11. This converts the electrical signal into a corresponding stain on the distributed feedback laser such that the distributed feedback laser provides an optical output signal corresponding to the strain and hence indicative of the dynamic pressure.

It will be appreciated that in practice the distributed feedback laser provides the optical signal in response to a feed, for example feed from a laser pump locate at one end of the optic fibre cable. Any reference in this specification to the provision or generation of an optical output signal by either a transducer or distributed feedback laser should be read as implicitly requiring such a feed.

One end of the fibre optic cable 15 is typically attached to a fibre optic signal decoding device, which receives, decodes and stores an optical signal that is transmitted along the fibre optic cable 15. In some embodiments the feed and decoding device are provided at the same end of the cable.

It will be appreciated that the use of a sensor for monitoring pressure, in combination with a transducer for converting electrical pressure information into optical information, effectively separates the acoustic sensing of the pressure signal from the optical transduction function and addresses them with separate devices.

As noted above, the pressure at a given depth typically consists of a depth-dependent static pressure and a dynamic pressure. The static pressure is essentially constant for any given depth, whereas the dynamic pressure is time-variant. The static pressure is usually many orders of magnitude greater than the dynamic pressure when the hydrophone is deployed to a significant depth. Hence, whilst at depth the sensor 11 provides an electrical signal having a first component indicative of the static pressure and a second component indicative of the dynamic pressure. Due to their relative sizes, the second component may be drowned out by the first component. For many applications this is undesirable because it is typically the dynamic pressure that is to be detected by the hydrophone unit 10. For this reason the embodiment of FIG. 2 includes a filter that is electrically connected to the sensor 11 so as to receive the electrical signal, filter out the first component, and output to the transducer 12 a filtered electrical signal indicative of substantially only the second component. In other words, the component of the electrical signal that arises substantially due to the static pressure (i.e. the first component) is filtered out, leaving substantially only the component of the electrical signal that arises substantially due to the dynamic pressure (i.e. the second component). Hence, the filter effectively depth-compensates the hydrophone.

Figure 2:
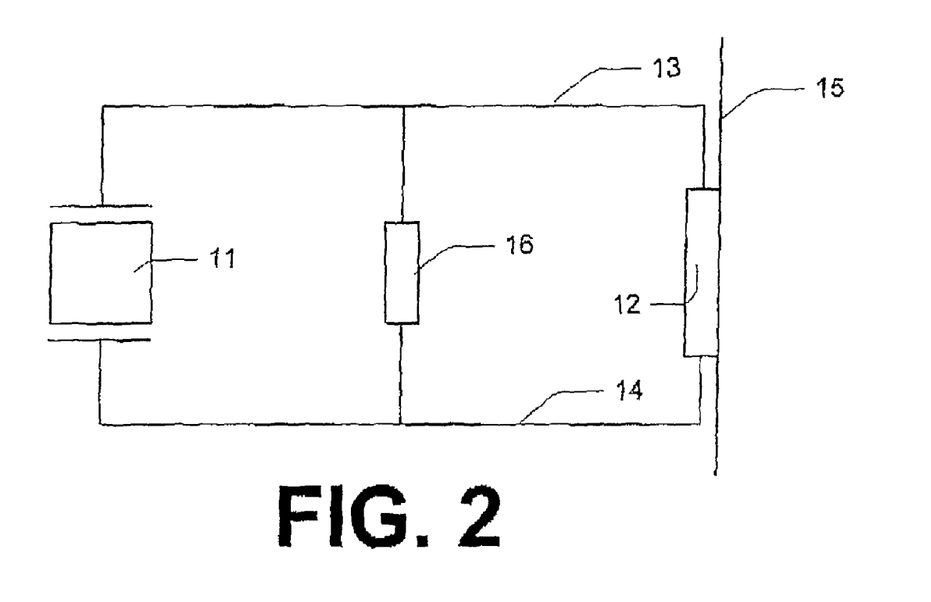
FIG. 2 is a circuit diagram of a second embodiment of the invention.

In the embodiment of FIG. 2 the filter includes a resistor 16 connected electrically parallel to the sensor 11. The resistance R of the resistor 16 acts in conjunction with the inherent capacitance C of the sensor 11 to form a tuned RC circuit. The resistor 16 therefore defines a cut-off frequency $f_0$ whereby frequency components of the electrical signal that are below $f_0$ are filtered out. The cut-off frequency is given by the following formula:

$$f_0 = 1/(2*\pi*R*C)$$

The sensor 11 may be a passive piezoelectric sensing ceramic, having a capacitance of C=20 nF. For an exemplary application in which a cut-off frequency of approximately 8 Hz is required, the above formula yields a value of for resistance R of 1 MΩ.

Although the filters herein are predominately described in terms of filters substantially defined by a resistor, in other embodiments other components such as inductors and capacitors are used. The design of such filters will be understood by those skilled in the art, and various appropriate combinations of resistors, capacitors and inductors will be recognised for use in other embodiments.

Figure 5:
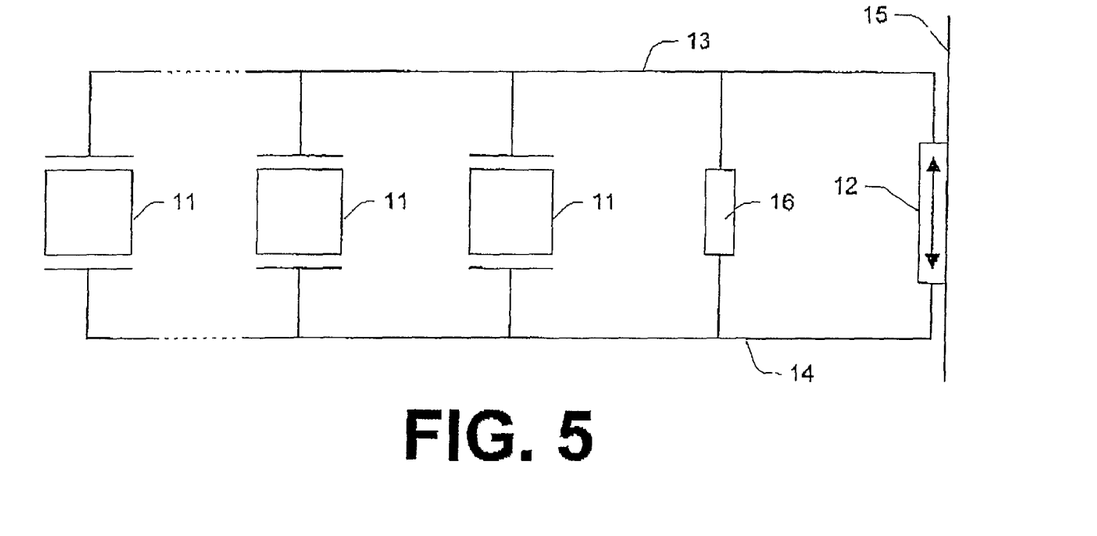
FIG. 5 is a circuit diagram showing an alternate arrangement whereby a plurality of sensors may be connected to a fibre optic cable.

The embodiment of FIG. 5 allows for the electrical interconnection of a large number of sensors 11 to form a compound sensor, for example a pressure sensing beam that occupies a single optical channel. That is, electrical information from the sensors II is converted into a common optical signal. Typical embodiments of a compound sensor include from two, to more than 100, to many thousands of electrically interconnected pressure sensors 11, the output of which may be transduced into a single fibre optic cable 15. The sensors 1 as shown in FIG. 5 are connected electrically parallel to each other. This arrangement provides an output that has a higher capacitance and lower voltage as compare to an alternative arrangement (not illustrated) in which the sensors 11 are electrically connected to each other in series. As is known to those skilled in the art, it is possible to select a parallel or series connection, or a combination of the two, depending upon the desired output. In any event, the electrical signals generated by the large numbers of sensors 11 are electrically summed to form a total output signal for the channel. The total output signal is communicated to a remote location via the fibre optic cable 15. For some applications, such as those in the towed array field, it is preferable to link many sensors 11 per channel. For example, it is sometimes desirable to link around 10 to 20 sensors to form a single optical channel. For other applications it may be necessary to link upwards of four hundred sensors 11 to form a single optical channel. This is achievable by utilising various embodiments of the present invention, however to the best of the inventor's knowledge it has not been readily achievable using known prior art fibre laser hydrophone arrangements.

Figure 4:
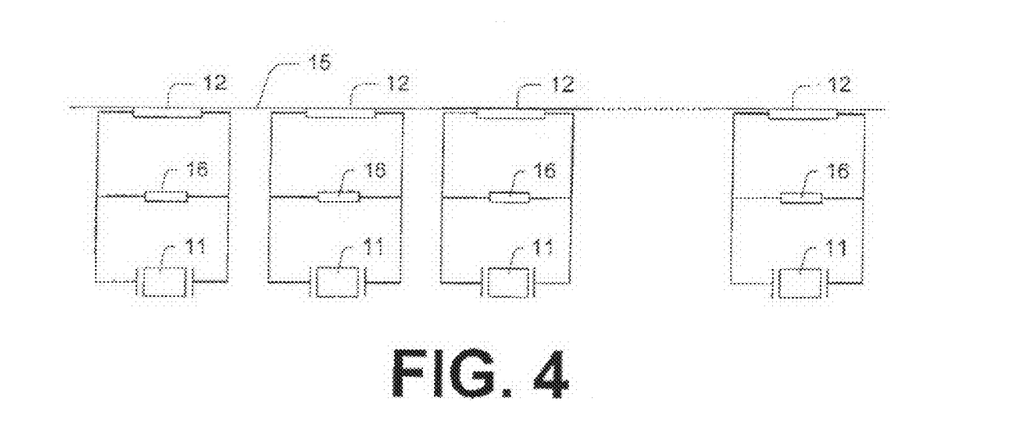
FIG. 4 is a circuit diagram showing a plurality of sensors and associated transducers connected to a fibre optic cable.

FIG. 4 illustrates one embodiment in which a plurality of sensors 11 are each electrically connected to a respective plurality of transducers 12. In contrast to the arrangement of FIG. 5, his arrangement does not sum the contributions from each of the sensors 11. Rather, the output of each of the sensors 11 is fed to its respective transducer 12 and then transmitted optically along the cable 15 in a multiplexed format. This allows the decoder to de-multiplex the optical signal so as to extract information regarding the pressure as detected by each of the individual sensors 11. Such an arrangement typically finds applications in remote sensing applications, for example sea bed arrays.

In some embodiments the transducer 12 is a passive transducer. In embodiments where both the sensor 11 and the transducer 12 are passive components, it is not necessary to provide an external power source to these components for operation of the hydrophone. This assists in minimising the bulk of cabling required to deploy the hydrophone. The use of passive circuitry at the "wet-end" of the cable also renders the hydrophone arrangement less susceptible to detection by third parties as compared to those systems in which the hydrophone is powered by an external power source. It also results in embodiments that are simpler, more reliable, lighter and easier to deploy.

In some embodiments, the capacitance of the transducer 12 is substantially matched to the capacitance of the sensor 11. That is, both of these components have a similar capacitance.

The fibre optic cable 15 includes a laser active region in the form of a distributed feedback laser 18, which in some embodiments incorporating a central active cavity and Bragg grating elements disposed on opposed sides of the cavity. When pumping radiation of, for example, 980 nm is transmitted into the laser active region, an optical signal is emitted having a wavelength that varies in accordance with a mechanical strain acting on the distributed feedback laser. Further information regarding such an arrangement is provided in co-pending Australian Provisional Patent Application No. 2004905573, the contents of which are hereby incorporated in their-entirety by way of reference.

As discussed in detail further below, some embodiments make use of a transducer that translates an electrical signal into mechanical movement. The traducer is physically coupled to the distributed feedback laser 18 such that the mechanical movement imparts a corresponding mechanical strain on the distributed feedback laser. This affects the optical properties of cable 15 in an observable manner. In particular, when a feed is applied the distributed feedback laser generates an optical signal having a wavelength corresponding to the strain.

Figure 3:
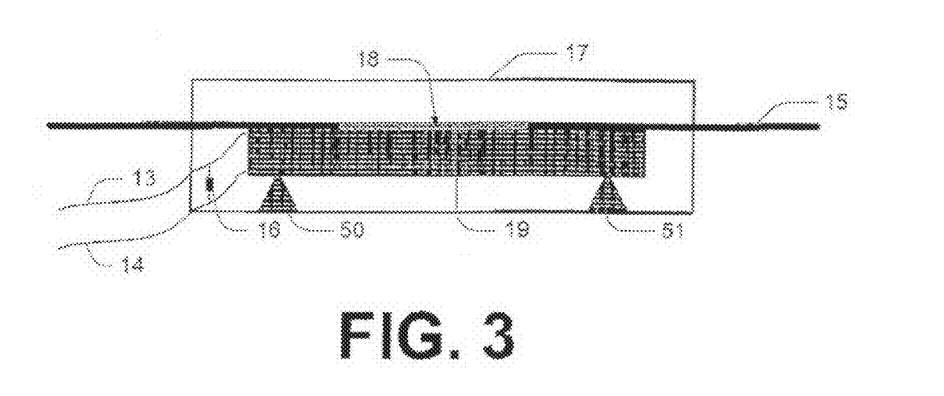
FIG. 3 is a side cross-sectional view of a transducer.

FIG. 3 illustrates one embodiment of a transducer 12 for use with embodiments of the present invention. The transducer 12 is housed within a stiff housing 17 so as to isolate the transducer 12 from pressure exerted by the liquid body. The transducer 12 includes a piezoelectric actuator 19 (also referred to as a "piezoelectric bender") mechanically connected to the portion of the fibre optic cable 15 having the distributed feedback laser 18. More particularly, the portion of the fibre optic cable 15 is attached along its length to one side of the piezoelectric bender 19. This attachment ensures that any bending movements that the piezoelectric bender 19 may undergo will cause a corresponding mechanical stain on the distributed feedback laser 18. The piezoelectric bender 19 is mounted upon two feet 50 and 51 to allow the actuator 19 to bend in response to received electrical signals.

Conductors 13 and 14 electrically connect the piezoelectric actuator 19 to the sensor 11. Hence, the electrical signal generated by the sensor 11 is fed to the piezoelectric actuator 19, causing it to bend and thereby strain the distributed feedback laser 18 in response to the electrical signal. This, in turn, causes a corresponding variation in the optical signal emitted from the distributed feedback laser 18 and then transmitted along the fibre optic cable 15 to the fibre optic signal decoding device. In this manner, the transducer 12 converts the electrical signal from the sensor 11 into an optical signal within the fibre optic cable 15.

Figure 6:
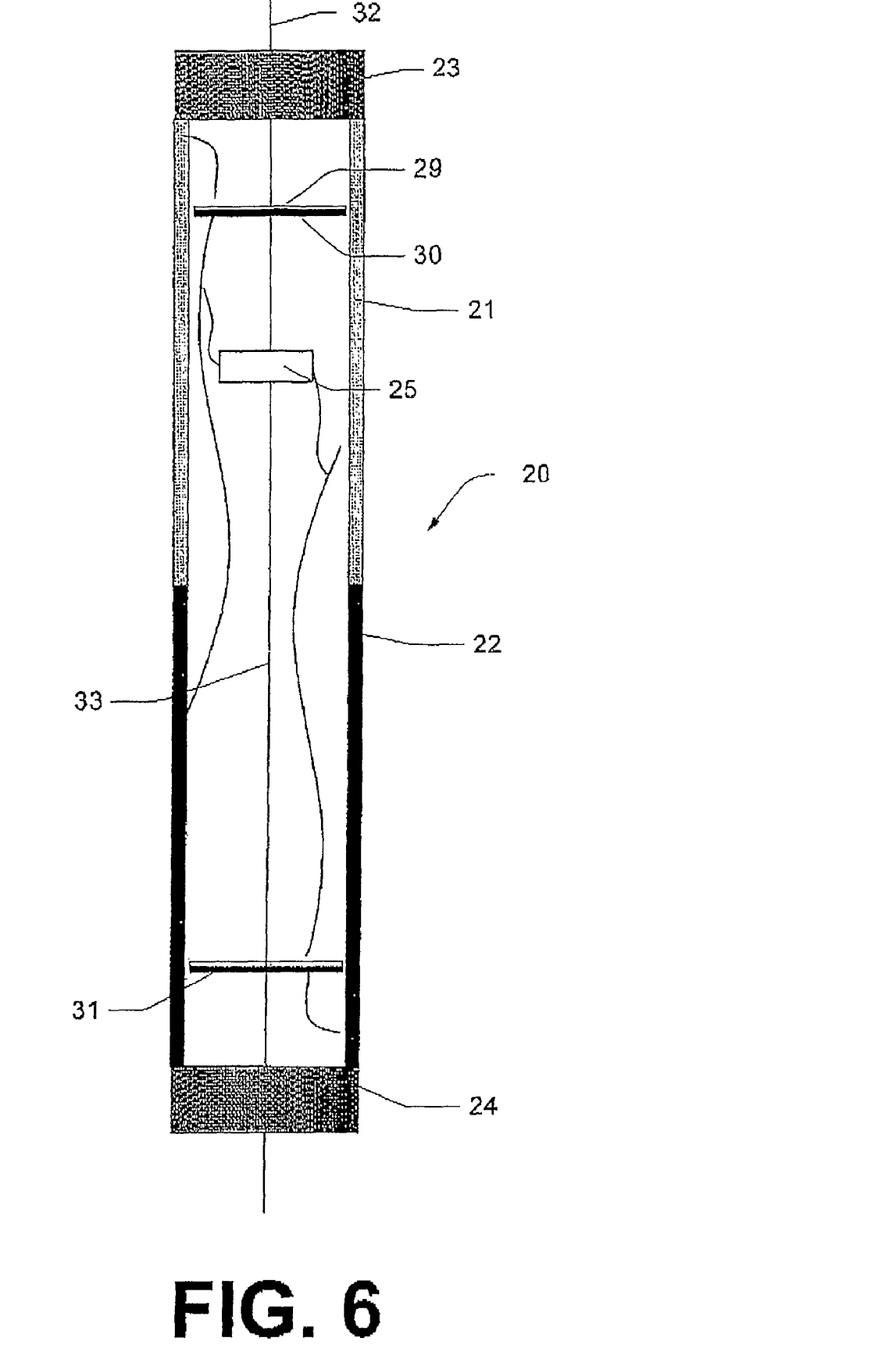
FIG. 6 is a side cross-sectional view of a third embodiment of the invention.

FIG. 6 illustrates another embodiment of a hydrophone unit 20 for immersion in a liquid body defining a depth-dependent static pressure and a dynamic pressure. The hydrophone unit 20 has an outer housing 21 comprised of a piezoelectric sensor 22 and a pair of end caps 23 and 24. The piezoelectric sensor 22 is cylindrical in shape and is 60 mm long and 20 mm in diameter. The piezoelectric sensor 22 provides an electrical signal having a first component indicative of the static pressure and a second component indicative of the dynamic pressure.

A resistor 25 is electrically connected to the piezoelectric sensor 22. The combination of the resistor 25 with the inherent capacitance of the piezoelectric sensor 22 effectively functions as a filter that receives the electrical signal from the piezoelectric sensor 22, filters out the first component, and outputs a filtered electrical signal indicative of substantially only the second component, thereby providing depth compensation.

Figure 7:
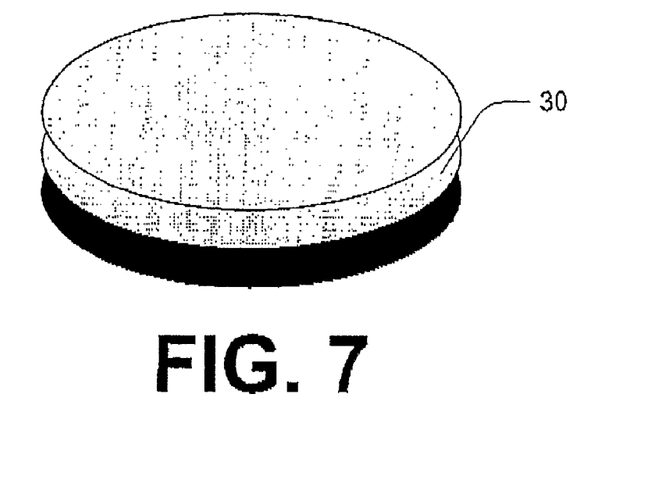
FIG. 7 is a perspective view of a bimorph piezoelectric actuator.
Figure 8:
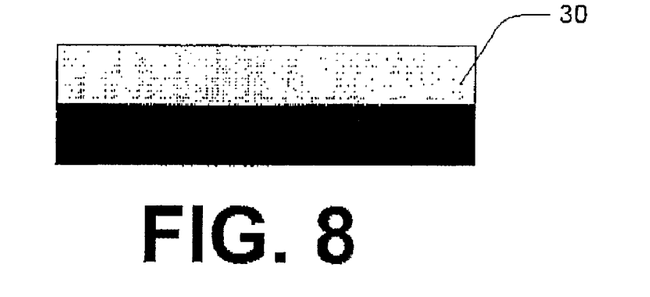
FIG. 8 is a side view of a bimorph piezoelectric actuator in a neutral state.
Figure 9:
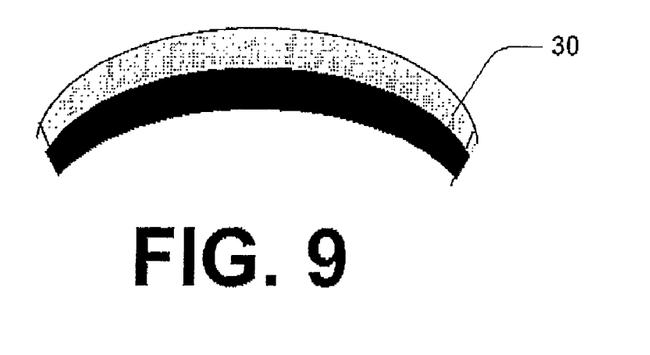
FIG. 9 is a side view of a bimorph piezoelectric actuator to which a voltage has been applied.

The transducer 29 is disposed within the housing 21, thereby isolating the transducer 29 from the pressure of the liquid body. The transducer 29 includes two bimorph piezoelectric actuators 30 and 31 spaced axially apart from each other. The bimorphs 30 and 31 are best shown in FIGS. 7 to 9. When no voltage is applied to the bimorphs, they assume a flat neutral state as shown in FIGS. 7 and 8. However, the bimorphs 30 and 31 are constructed from two interconnected layers of piezoelectric material that are poled such that, upon the application of a voltage, one of the piezoelectric layers expands and the other contracts. This causes the bimorphs 30 and 31 to bend, as shown in FIG. 9. The bimorph piezoelectric actuators 30 and 31 are electrically connected to the resistor 25 such that the two bimorphs 30 and 31 move in opposite directions in response to the filtered electrical signal.

A portion of the fibre optic cable 32, including the distributed feedback laser 33, extends in a mildly tensioned state intermediate the two bimorphs 30 and 31. That is, a portion of the cable 32 is held by the two bimorphs 30 and 31. Hence, bending of the bimorphs 30 and 31 imparts a corresponding strain onto the distributed feedback laser 33 so as to convert the filtered electrical signal into a corresponding optical output signal within the fibre optic cable 32.

The mechanical compliance of the transducer 29 is substantially matched to the mechanical compliance of the fibre optic cable 32. Additionally, the power output of the piezoelectric sensor 22 is matched to the efficiency and required strain output of the piezoelectric actuators 30 and 31. More particularly, in the embodiment shown in FIG. 6, the piezoelectric sensor 22 has a sensitivity of 0.2 mV per Pascal of acoustic pressure. The electrical energy provided by the piezoelectric sensor 22 is given by the equation $(C^*V^2)/2$. Hence, the electrical energy provided by the piezoelectric sensor 22 per Pascal of acoustic pressure is $400 \times 10^{-18}$ J. The stain required in the distributed feedback laser 33 per Pascal of acoustic pressure is $1 \times 10^{-9} \epsilon$ and the fibre optic cable 32 has a stiffness constant k=16 kN/m. The mechanical energy required to strain the cable 32 is given by $(kx^2)/2$. Hence, the mechanical energy required to stain the cable 32 per Pascal of acoustic pressure is $20 \times 10^{-18}$ J. The bimorphs 30 and 31 have an effective efficiency of approximately 10%. Hence, feeding of the electrical energy of $400 \times 10^{-8}$ J per Pascal of acoustic pressure into the bimorphs 30 and 31 yields around $40 \times 10^{-18}$ J of mechanical energy with which to strain the fibre. It therefore follows that the power output of the piezoelectric sensor 22 is more than sufficient to allow the bimorphs 30 and 31 to impart the required strain onto the distributed feedback laser 33.

Figure 10:
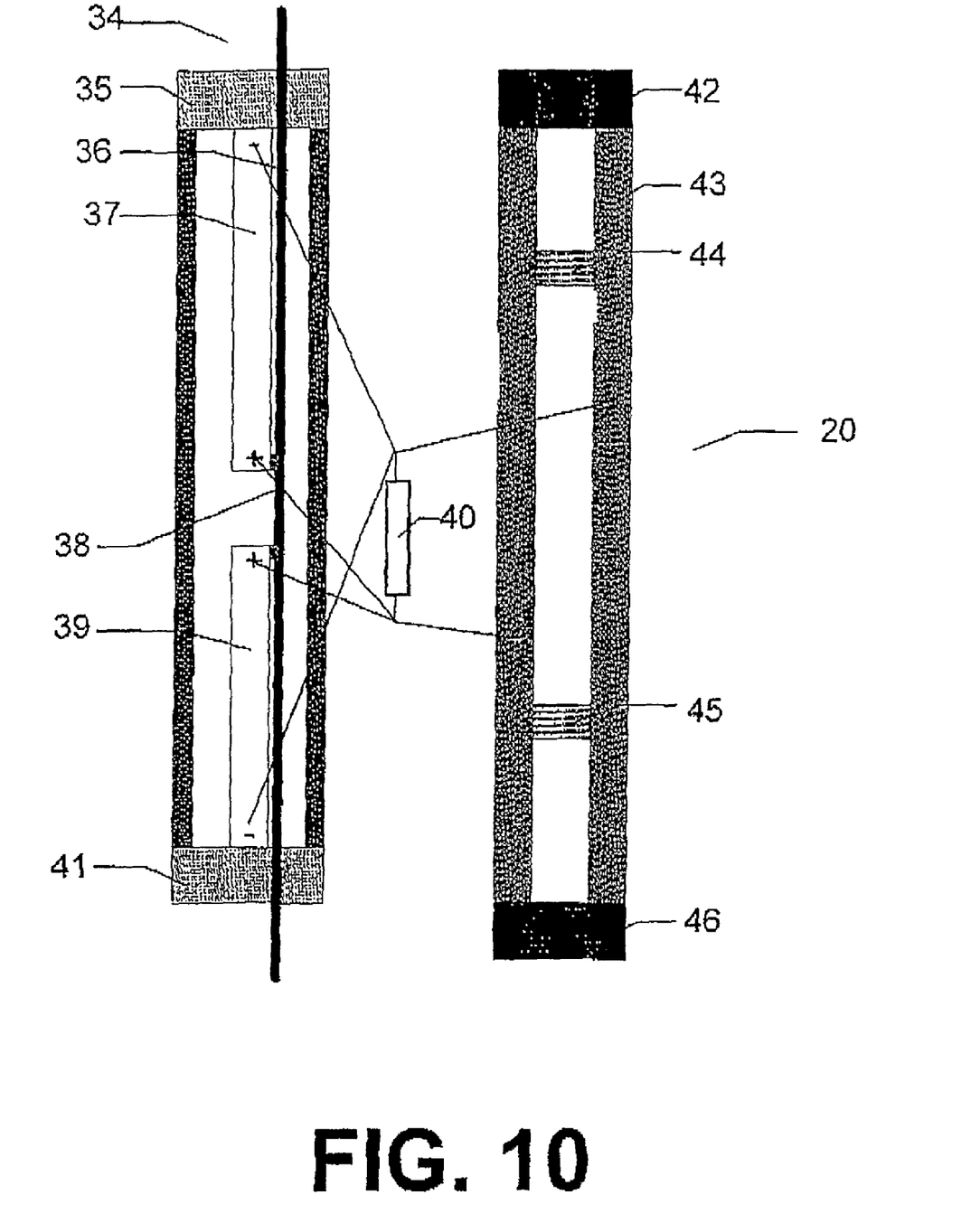
FIG. 10 is a side cross-sectional view of a further embodiment of the invention.

FIG. 10 illustrates another embodiment of the invention, in the form of a hydrophone unit 20. Once again, this hydrophone unit 20 is designed for immersion in a liquid body defining a depth-dependent static pressure and a dynamic pressure. Hydrophone unit 20 includes a first housing 36 for containing pressure sensing components and a second discrete housing 43 for containing optical and transducing components.

Housing 43 includes end caps 42 and 46 connected by a conductive sidewall. Under pressure, the housing compresses and in doing so acts on a pair of piezoelectric elements 44 and 45. In response, these elements provide an electric signal having components indicative of both the static and dynamic pressures of the liquid body. More specifically, these elements provide an electrical signal having a first component indicative of the static pressure and a second component indicative of Se dynamic pressure.

Housing 36 is rigid for isolating components maintained therein from the effects of both static and dynamic pressure. A pair of piezoelectric stacks 37 and 39 is provided within housing 36, these stacks being electrically coupled to the piezoelectric elements 44 and 45 by way of the conductive sidewall of housing 43. When either or both of static and dynamic pressure are applied to housing 43, this pressure is amplified by the ratio of the area of the housing 43 to the piezoelectric elements 44 and 45, and the piezoelectric elements 44 and 45 produce a voltage in proportion the applied pressure.

The voltage produced by the piezoelectric elements 43 and 45 varies over time as a result of the static and dynamic pressures. As was the case in embodiments above, hydrophone unit 20 is configured such that voltage effects caused by the static pressure are filtered out. To this end, a resistor 40 is provided electrically intermediate the piezoelectric elements 43 and 45 and the piezoelectric stacks 37 and 39. Resistor 40, in light of the inherent capacitance of the piezoelectric elements 44 and 45 and the piezoelectric stacks 37 and 39, effectively functions as a filter that receives the electrical voltage signal from the piezoelectric elements 44 and 45 and fitters out the effects of static pressure. This filtered voltage signal is applied to the piezoelectric stacks 37 and 39, which extend or contract in response. As such, in the present embodiment, the piezoelectric stacks 37 and 39 are affected substantially only by the dynamic pressure.

Although the resistor is illustrated as being external of housings 46 and 43, in practice it may be located in either of these housings. In some embodiments both housings are contained in a common oil filled tube.

A benefit associated with the positioning of the piezoelectric stacks 37 and 39 within the rigid housing 36 is that a distributed feedback laser 39 in a fibre optic cable 39 is able to be effectively isolated from the direct influence of the pressure exerted by the liquid body. A portion of the fibre optic cable 34, including the distributed feedback laser 39, extends in a mildly tensioned state intermediate the two piezoelectric stacks 37 and 39, which hold this portion of cable. Hence, extension or contraction of the piezoelectric stacks 37 and 39 imparts a corresponding strain onto the distributed feedback laser 38 so as to convert the filtered electrical signal into a corresponding optical output signal within the fibre optic cable 34. The piezoelectric stacks 37 and 39 are spaced within housing 36 to provide a relatively high amount of strain amplitude over the active region of the fibre optic cable upon extension or contraction of these stacks.

The combination of housing 43 and piezoelectric elements 44 and 45 provide a voltage proportional to the acoustic pressure. The piezoelectric stacks 37 and 39 then convert this voltage to a displacement on the fibre laser thereby providing the hydrophone with an overall sensitivity to acoustic pressure.

Figure 11:
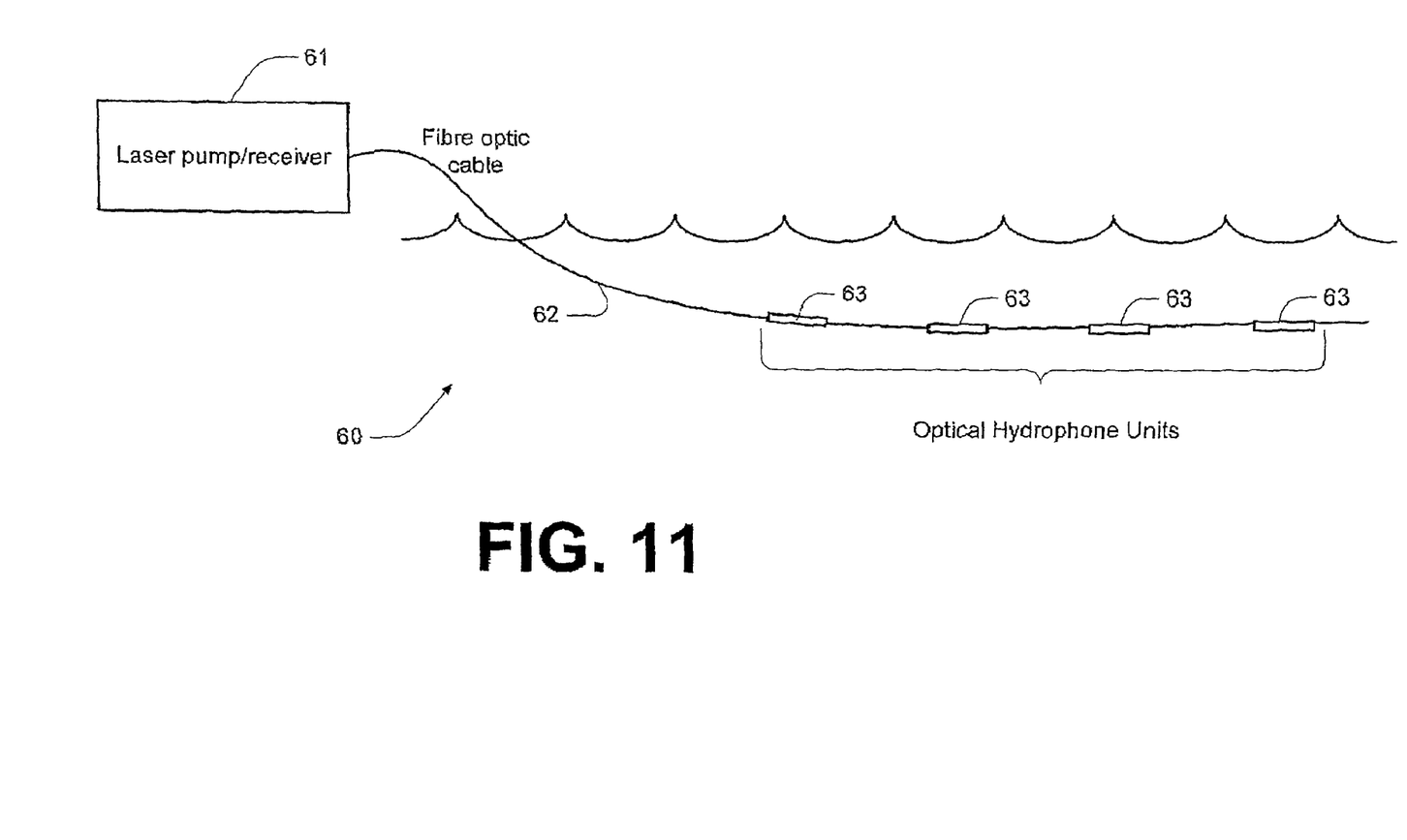
FIG. 11 schematically illustrates a further embodiment of the invention.

FIG. 11 illustrates an embodiment in the form of a hydrophone system 60. System 60 includes a pump laser/receiver unit 61 for providing a feed signal in a fibre optic cable 62, and for measuring signals received through the cable 62. Cable 62 includes a plurality of spaced apart distributed feedback lasers, each of these being approximately 50 mm in length. Each distributed feedback laser includes a rare earth doping element, such as erbium, and a Bragg grating/resonant cavity. The Bragg grating/resonant cavity arrangements are individually tuned such that each distributed feedback laser generates optical signals having wavelengths within a different range. The generated signal wavelength for a given distributed feedback laser falls within this range, the precise value being determined by the degree of mechanical strain being imparted on the laser at a given point in time.

An optical hydrophone unit 63 is provided to contain each distributed feedback laser and in doing so isolate each of these from the effects of external pressure. Each unit 63 is about 100 mm in length, and it will be appreciated that this is typically sufficient length to adequately contain and isolate one of the distributed feedback lasers. The specific optical hydrophone units used very between embodiments, and are optionally selected from units described above. Typically, each unit is a similar unit including:

A pressure sensing component far providing an electrical signal indicative of the pressure exerted by the body of water. For example, a piezoelectric based sensor that provides an electric signal in response to pressure variations without the need for an external power supply.

A transducer responsive to the electric signal for exerting a corresponding mechanical strain on the contained laser active region. For example, in some embodiments a piezoelectric actuator that changes in shape and/or configuration in response to the electric signal is mechanically coupled to the laser active region. Again, the use of piezoelectric component negates the need for an external power supply.

A filter, such as a resistor intermediate the pressure sensing component and the transducer, for filtering out aspects of the electric signal that are indicative of static pressure.

In use, the cable 62 and units 63 are deployed in a body of water. The pump laser provides a feed, and optical signals generated by the distributed feedback lasers are subsequently received, Data indicative of the received optical signals is typically stored for later analysis. This analysis includes identifying from the received signals components of the signal that were generated at each of the units 63—or more specifically at the distributed feedback laser of each of these units. It will be appreciated that the individual tuning of the distributed feedback lasers makes this possible, and effectively each unit operates on a unique channel. The components of generated signals relating to each unit are then processed to determine the dynamic pressure measurements made at each unit. This is achieved by analysing the optical signal component in light of knowledge of the properties of the distributed feedback laser, the sensitivity of the transducer to electric signals, the effects of filtering, and the sensitivity of the pressure sensor to changes in pressure.

Some of the embodiments provide one or more of the following advantages in a fibre laser sensing context:

Ameliorating the problem of depth compensation, thereby potentially improving sensitivity and decreasing the bandwidth required to communicate the dynamic pressure signal from each individual sensor 11.

Reducing or eliminating reliance upon an external electrical power source through the use of passive electrical circuitry at the "wet end".

Allowing a large number of sensing elements to be used to form a compound pressure signal, which in one embodiment occupies one optical channel, thereby widening the application of fibre laser hydrophone arrangements to fields such as towed arrays.

Allowing small and simple hydrophone units to be manufactured, and for these units to be spaced along a single fibre optic cable.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, functionality may be added or deleted from the block diagrams and elements may be interchanged among functional blocks.

The invention claimed is:

1. A hydrophone for immersion in a liquid body defining a depth-dependent static pressure and a dynamic pressure, the hydrophone comprising:
   a sensor for providing an electrical signal having a first component indicative of the static pressure and a second component indicative of the dynamic pressure;
   a filter electrically connected to the sensor so as to receive the electrical signal, filter out the first component, and output a filtered electrical signal indicative of substantially only the second component; and
   a transducer electrically connected to the filter, the transducer being responsive to the second component for acting upon a distributed feedback laser in a fibre optic cable so as to convert the filtered electrical signal into a corresponding strain on the distributed feedback laser such that the distributed feedback laser provides an optical output signal corresponding to the strain and hence indicative of the dynamic pressure.

2. A hydrophone according to claim 1 wherein the transducer comprises a passive transducer.

3. A hydrophone according to claim 2 wherein an impedance of the transducer is substantially matched to an impedance of the sensor.

4. A hydrophone according to claim 1 wherein a mechanical compliance of the transducer is substantially matched to a mechanical compliance of the fibre optic cable.

5. A hydrophone according to claim 1 wherein the filter defines a cut-off frequency such that frequency components of the electrical signal below the cut-off frequency are filtered out.

6. A hydrophone according to claim 1 wherein the filter comprises a resistor connected electrically parallel to the sensor, the resistor acting in conjunction with a capacitance of the sensor so as to form a tuned RC circuit.

7. A hydrophone according to claim 1 wherein the sensor comprises a piezoelectric sensing ceramic.

8. A hydrophone according to claim 1 wherein the transducer is housed within a stiff housing so as to isolate the transducer from pressure exerted by the liquid body.

9. A hydrophone according to claim 1 wherein the distributed feedback laser defines an emitted wavelength varying in accordance with a mechanical strain acting on the distributed feedback laser and wherein the transducer comprises a piezoelectric actuator mechanically connected to a portion of the fibre optic cable including the distributed feedback laser, the piezoelectric actuator being electrically connected to the sensor so as to strain the distributed feedback laser in response to the electrical signal.

10. A hydrophone according to claim 1 further comprising a plurality of sensors electrically connected to the transducer.

11. A hydrophone according to claim 10 wherein at least some of the sensors are connected electrically parallel to each other.

12. A hydrophone according to claim 10 wherein at least some of the sensors are connected electrically in series with one another.

13. A hydrophone according to claim 11 wherein at least some of the sensors are connected electrically in series with one another.

14. A hydrophone for immersion in a liquid body defining a depth-dependent static pressure and a dynamic pressure, the hydrophone comprising:

an outer housing comprising a piezoelectric sensor for providing an electrical signal having a first component indicative of the static pressure and a second component indicative of the dynamic pressure;

a filter electrically connected to the piezoelectric sensor so as to receive the electrical signal, filter out the first component, and output a filtered electrical signal indicative of substantially only the second component; and a transducer disposed within the housing, the transducer comprising at least one piezoelectric actuator electrically connected to the filter such that the piezoelectric actuator is movable in response to the filtered electrical signal, the piezoelectric actuator being mechanically connected to a distributed feedback laser in a fibre optic cable so as to convert the filtered electrical signal into a corresponding strain on the distributed feedback laser such that the distributed feedback laser provides an optical output signal corresponding to the strain and hence indicative of the dynamic pressure.

15. A hydrophone according to claim 14 wherein the piezoelectric actuator comprises a first bimorph piezoelectric actuator.

16. A hydrophone according to claim 15 further comprising a second bimorph piezoelectric actuator spaced apart from the first bimorph piezoelectric actuator, the fibre optic cable, including the laser active region, extending intermediate the first and second bimorph piezoelectric actuators.

* * * * *